United States Patent
Xie

(10) Patent No.: US 11,102,644 B2
(45) Date of Patent: Aug. 24, 2021

(54) NETWORK CONFIGURATION METHOD AND APPARATUS

(71) Applicant: BEIJING XIAOMI MOBILE SOFTWARE CO., LTD., Beijing (CN)

(72) Inventor: Yan Xie, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/815,834

(22) Filed: Mar. 11, 2020

(65) Prior Publication Data

US 2021/0168592 A1 Jun. 3, 2021

(30) Foreign Application Priority Data

Nov. 28, 2019 (CN) .......................... 201911193816.X

(51) Int. Cl.
| | | |
|---|---|---|
| *H04L 29/08* | (2006.01) | |
| *H04L 29/06* | (2006.01) | |
| *H04W 12/06* | (2021.01) | |
| *H04W 8/24* | (2009.01) | |
| *H04W 4/70* | (2018.01) | |
| *H04W 12/08* | (2021.01) | |

(52) U.S. Cl.
CPC ............. *H04W 8/245* (2013.01); *H04W 4/70* (2018.02); *H04W 12/068* (2021.01)

(58) Field of Classification Search
USPC ........ 709/222, 223, 220, 203, 221, 217, 246
See application file for complete search history.

(56) References Cited

U.S. PATENT DOCUMENTS

| 7,346,344 | B2* | 3/2008 | Fontaine ............... H04W 8/183 455/418 |
| 8,966,018 | B2* | 2/2015 | Bugwadia ........... H04L 41/0856 709/220 |
| 10,264,138 | B2* | 4/2019 | Raleigh ............... H04L 63/0428 |
| 2008/0240068 | A1* | 10/2008 | Ishimoto ............ H04W 12/003 370/345 |
| 2013/0173755 | A1* | 7/2013 | Hattori .................. H04W 4/029 709/219 |
| 2014/0033288 | A1* | 1/2014 | Wynn ................... H04L 67/141 726/7 |

(Continued)

FOREIGN PATENT DOCUMENTS

EP    3554158 A1    10/2019

OTHER PUBLICATIONS

Supplementary European Search Report in the European Application No. 20165636.0, dated Oct. 12, 2020, (10p).

*Primary Examiner* — Jude Jean Gilles
(74) *Attorney, Agent, or Firm* — Arch & Lake LLP

(57) ABSTRACT

The disclosure relates to a method and an apparatus for network configuration. The method includes: sending an acquisition request to a second device, in response to determining that a first device requires network configuration; receiving network configuration information sent by the second device according to the acquisition request, the network configuration information including network configuration information of one or more wireless networks to which the second device had been connected; and configuring, based on the network configuration information, a wireless network accessible by the first device.

16 Claims, 8 Drawing Sheets

(56) References Cited

U.S. PATENT DOCUMENTS

| | | | |
|---|---|---|---|
| 2014/0220895 A1* | 8/2014 | Wei | H04W 4/70 |
| | | | 455/41.2 |
| 2015/0382184 A1* | 12/2015 | Takazoe | H04L 61/6068 |
| | | | 370/475 |
| 2016/0044720 A1* | 2/2016 | Boucher | H04W 76/11 |
| | | | 370/310 |
| 2016/0156635 A1* | 6/2016 | Liu | H04W 4/02 |
| | | | 726/4 |
| 2017/0273011 A1 | 9/2017 | Rico Alvarino et al. | |
| 2018/0092027 A1 | 3/2018 | Sheng | |
| 2018/0278708 A1* | 9/2018 | Ishihara | H04L 67/2852 |
| 2018/0359628 A1* | 12/2018 | Breuer | H04L 65/80 |
| 2019/0320443 A1 | 10/2019 | Wang et al. | |
| 2020/0076896 A1* | 3/2020 | Anumala | H04W 4/70 |
| 2020/0092776 A1* | 3/2020 | Edge | H04W 8/12 |

* cited by examiner

NETWORK CONFIGURATION METHOD AND APPARATUS

CROSS-REFERENCE TO RELATED APPLICATION

This application is based upon and claims priority to Chinese Patent Application No. CN201911193816.X, filed on Nov. 28, 2019, the contents of which are incorporated hereby in its entirety.

BACKGROUND

The Internet of Things (IOT) is an important part of a new generation of information technology and an important stage of development in the "information" era. As the name suggests, the Internet of Things refers to an internet where everything is connected to each other. This has two meanings: first, the core and foundation of the IOT is still the Internet, which means the IOT is an extended and expanded network based on the Internet; and second, a client of the IOT extends and expands to any items for information exchange and communication, that is, correlation of everything. The Internet of Things is widely used in the convergence of networks through communication perception technologies such as intelligent perception, identification technology and pervasive computing, and therefore called the third wave of the world's information industry development after computers and the Internet.

Based on the development of the Internet of Things technology, various Internet of Things devices have appeared, such as smart air conditioners and smart air purifiers. When accessing a wireless network to communicate with other devices, the Internet of Things devices need to acquire network configuration information.

SUMMARY

The disclosure relates to the technical field of Internet of Things, and more particularly, to a method and an apparatus for network configuration in smart homes.

According to a first aspect of the disclosure, a method of network configuration is provided. The method may be applied to a first device. The method may include: sending an acquisition request to a second device in response to determining that the first device requires network configuration; receiving network configuration information sent by the second device according to the acquisition request, the network configuration information including network configuration information of one or more wireless networks to which the second device had been connected; and configuring, based on the network configuration information, a wireless network accessible by the first device.

According to a second aspect of the disclosure, a method of network configuration for enabling wireless network access of a first device is provided. The method may be applied to a second device. The method may include: receiving an acquisition request sent by the first device that requires network configuration; and sending, according to the acquisition request, network configuration information of one or more wireless networks to which the second device had been connected, where the network configuration information enables the first device to access a wireless network.

According to a third aspect of the disclosure, an apparatus of network configuration is provided. The apparatus may be applied to a first device. The apparatus may include: one or more processors; and a memory configured to storing instructions executable by the one or more processors. The one or more processors, upon execution of the instructions, are configured to: send, in response to determining that the first device requires network configuration, an acquisition request to a second device; receive network configuration information sent by the second device according to the acquisition request, the network configuration information including network configuration information of one or more wireless networks to which the second device had been connected; and configure, based on the network configuration information, a wireless network accessible by the first device.

According to a fourth aspect of the disclosure, an apparatus of network configuration for enabling wireless network access of a first device is provided. The apparatus may be applied to a second device. The apparatus may include: one or more processors; and a memory configured to storing instructions executable by the one or more processors. The one or more processors, upon execution of the instructions, are configured to: receive an acquisition request sent by the first device that requires network configuration; and send, according to the acquisition request, network configuration information of one or more wireless networks to which the second device had been connected, where the network configuration information enables the first device to access a wireless network.

It is to be understood that the above general descriptions and detailed descriptions below are only exemplary and explanatory and not intended to limit the disclosure.

BRIEF DESCRIPTION OF THE DRAWINGS

The accompanying drawings, which are incorporated in and constitute a part of this specification, illustrate examples consistent with the disclosure and, together with the specification, serve to explain the principles of the disclosure.

DETAILED DESCRIPTION

Reference will now be made in detail to exemplary aspects, examples of which are illustrated in the accompanying drawings. The following description refers to the accompanying drawings in which the same numbers in different drawings represent the same or similar elements unless otherwise represented. The implementations set forth in the following description of exemplary aspects do not represent all implementations consistent with the disclosure. Instead, they are merely examples of apparatuses and methods consistent with aspects related to the disclosure.

The terminology used in the present disclosure is for the purpose of describing particular examples only and is not intended to limit the present disclosure. As used in this disclosure and the appended claims, the singular forms "a", "an", and "the" are intended to include the plural forms as well, unless the context clearly indicates otherwise. It should also be understood that the term "and/or" as used herein refers to and includes any and all possible combinations of one or more of the associated listed items.

It should be understood that, although the terms "first," "second," "third," and the like may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Figure 1:
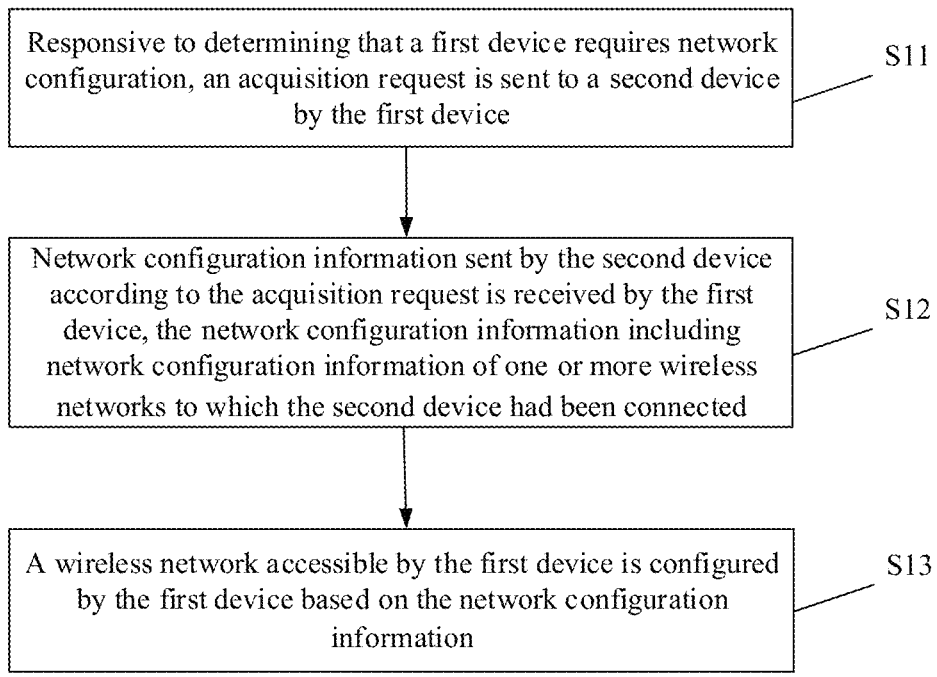
FIG. 1 is a first flowchart showing a network configuration method according to an example of the disclosure.

FIG. 1 is a first flowchart showing a network configuration method according to an example of the disclosure. The network configuration method is applied to a first device. As shown in FIG. 1, the network configuration method includes the following operations.

In S11, responsive to determining that the first device requires network configuration, an acquisition request is sent to a second device by the first device.

In S12, network configuration information sent by the second device according to the acquisition request is received by the first device, the network configuration information including network configuration information of one or more wireless networks to which the second device had been connected.

In S13, a wireless network accessible or joinable by the first device is configured by the first device based on the network configuration information.

In the examples of the disclosure, the first device refers to an Internet of Things device that needs to exchange information with other devices, and includes smart devices, such as a floor sweeping robot, a smart watch, a smart speaker, or a smart TV.

The first device may exchange information with other devices based on wireless communication technologies such as Wireless-Fidelity (Wi-Fi), Bluetooth, and Zigbee. However, before exchanging information, the first device and an interactive device need to work within the same local area network. When the first device fails to access the local area network, it is necessary for the first device to obtain network configuration information in advance to access the local area network.

For example, the first device includes a Wi-Fi module, and the first device exchanges information with other devices based on the Wi-Fi module. For example, a smart speaker exchanges, based on a built-in Wi-Fi module, information with a mobile phone that manages smart devices; or, the smart speaker exchanges information with a smart TV based on the built-in Wi-Fi module.

In the examples of the disclosure, the network configuration information at least includes a wireless network identifier, and may further include a password corresponding to the wireless network identifier. For example, the wireless network identifier may be a Service Set Identifier (SSID), which is used to distinguish between different networks. The SSID may be the name of a local area network. Devices provided with the same SSID value may communicate with each other within a corresponding local area network.

In S11, upon determining that the first device requires network configuration, the first device will actively send an acquisition request for network configuration information to the second device. However, the first device may send an acquisition request based on a communication mode different from that corresponding to the network configuration information that is required to be obtained by the first device in the absence of network configuration. For example, the first device acquires network configuration information of a Wi-Fi network. The first device may send an acquisition request to the second device based on a Bluetooth or Zigbee communication mode, or send an acquisition request to the second device through a Subscriber Identity Module (SIM) and a cellular mobile communication network.

In the examples of the disclosure, the first device determines in advance whether it requires network configuration. In one example, the operation that the first device determines that it requires network configuration includes:

if a position variation of the first device is greater than a predetermined threshold, it is determined that the first device requires network configuration.

As mentioned above, the first device interacts with other devices based on a wireless communication technology such as Wi-Fi, Bluetooth and Zigbee, and the wireless communication technology is limited in distance. Therefore, when the first device moves from an original position covered with a local area network to a new position, a wireless network needs to be reconfigured. In this example, the first device is in a first position at a first time and is in a second position at a second time, a variation between the first position and the second position is greater than a predetermined distance threshold. That is, if a position variation of the first device is greater than a predetermined threshold, the first device determines that network distribution is required.

The first position and the second position of the first device may be acquired based on enabling of a Global Positioning System (GPS) service, or BeiDou Navigation Satellite System (BDS) service by the first device.

In one example, the operation that the first device determines that it requires network configuration includes:

when searching for a wireless network corresponding to the network configuration information stored by the first device fails, that is, the first device fails to find a wireless network corresponding to the network configuration information stored by the first device, it is determined that the first device requires network configuration; and/or when accessing of the wireless network based on the network configuration information stored by the first device fails, that is, the first device fails to access the wireless network based on the network configuration information stored by the first device, it is determined that the first device requires network configuration.

In this example, the first device has accessed a wireless network and stored network configuration information corresponding to the accessed wireless network. However, in one case, the first device may fail to find a wireless network corresponding to the stored network configuration information due to change in position of the first device. Thus, the first device determines that network configuration is required.

In another case, the position of the first device may be changed, or the position of the first device may not be changed, but the wireless network corresponding to the network configuration information stored by the first device fails. The first device fails to request to access the wireless network based on the stored network configuration information. Therefore, the first device also determines that network configuration is required.

In one example, when the position variation of the first device is greater than a predetermined threshold and no wireless network corresponding to the network configuration information stored by the first device is found, or, the position variation of the first device is greater than a predetermined threshold and accessing of the wireless network based on the network configuration information stored by the first device fails, the first device determines that network configuration is required. In the examples of the disclosure, the second device may be a management device that manages the first device, and the management device may be a mobile phone or a wearable device commonly used by users. The second device may also be an IOT device different from the first device. For example, the first device is a smart speaker and the second device is a smart TV.

In the examples of the disclosure, a user may implement automatic network configuration for other devices, such as a first device, by network configuration for a management device to allow the management device to store network configuration information of one or more wireless networks to which the management device had been connected. Therefore, the user does not need to manually input the network configuration information, thereby improving the intelligence of network configuration.

For example, the second device is a mobile phone for managing a smart device, and network configuration information of a wireless network to which the mobile phone had been connected may be stored by an Application (App) installed in the second device. For example, when Wi-Fi accounts of home and company have been connected by the user through his/her mobile phone using corresponding passwords, a APP of the mobile phone may store the Wi-Fi accounts and passwords of home and company. The stored Wi-Fi accounts and passwords belong to the network configuration information of the wireless network to which the second device had been connected.

The mobile phone APP synchronously storing the network configuration information of the wireless network to which the mobile phone was connected may also be performed under the user's permission. For example, when the mobile phone accesses the wireless network, a prompt message is sent via the mobile phone APP to remind the user whether to store the network configuration information corresponding to the wireless network. The mobile phone APP may store, under the user's permission, the network configuration information of the wireless network to which the mobile phone was connected. In S12, the second device may send, based on confirmation from a user, the network configuration information of one or more wireless networks to which the second device had been connected.

In one example, S12 includes:

when the acquisition request carries a wireless network identifier of a wireless network searched by the first device, network configuration information, that matches the wireless network identifier, sent by the second device based on the acquisition request is received; and/or when the acquisition request does not carry the wireless network identifier, network configuration information of at least one of the one or more wireless networks, stored by the second device and sent by the second device based on the acquisition request, is received.

In the examples of the disclosure, the first device may operate in a wireless terminal (Station, STA) mode when not networked, that is, when failing to access any wireless network. In the STA mode, the first device can broadcast a detection request frame and receive a detection response frame sent from different access gateways, the detection response frame carrying a network identifier of the wireless network. Therefore, the first device may acquire a wireless network identifier of the wireless network, such as a Wi-Fi account, based on the received detection response frame, and the wireless network identifier is carried in the acquisition request sent to the second device. After receiving the acquisition request carrying the wireless network identifier, the second device compares the received wireless network identifier with the wireless network identifiers in the network configuration information stored by the second device, and sends, to the first device, the network configuration information that matches the received wireless network identifier such as a password. After receiving the network configuration information, the first device may quickly access a wireless network corresponding to the wireless network identifier found based on the received network configuration information.

In an example, when the first device sends the acquisition request, a wireless network identifier may not be carried in the acquisition request. At this time, the first device may receive network configuration information of one or more wireless networks, returned by the second device and stored in the second device. For example, the first device receives the network configuration information of all wireless networks stored in the second device. The first device receives the network configuration information of all wireless networks, sent by the second device and stored in the second device, and performs network configuration according to network configuration information corresponding to a current wireless network found by the first device.

It can be understood that when the first device acquires network configuration information of a plurality of wireless networks based on one acquisition request, the first device may quickly perform network configuration based on the network configuration information of the plurality of wireless networks without sending an acquisition request to the second device each time.

For example, the first device is a smart watch, and the second device stores network configuration information of respective wireless networks in home A, home B and home C. When moving from a coverage range of a wireless network of home A to a coverage range of a wireless network of home B, the smart watch will send an acquisition request to the second device, and the second device will send all the stored network configuration information of the respective wireless networks of home A, home B and home C to the smart watch. Therefore, when the smart watch moves to the wireless network coverage range of home C, network configuration may be directly performed by the first device based on the acquired network configuration information of the wireless network of home C, without sending an acquisition request again, thereby increasing the speed of network configuration.

It can be understood that in the examples of the disclosure, when determining that network configuration is required, a first device sends an acquisition request to a second device to obtain network configuration information that is stored in the second device and belongs to a wireless network to which the second device had been connected.

After obtaining the network configuration information, the first device may configure and join an accessible wireless network. In this process, after an active request for network configuration from the first device, the network configuration information of one or more wireless networks to which the second device had been connected may be automatically obtained and network configuration may be implemented by the first device, without manually input the network configuration information by the user, thereby improving the intelligence of network configuration.

Figure 2:
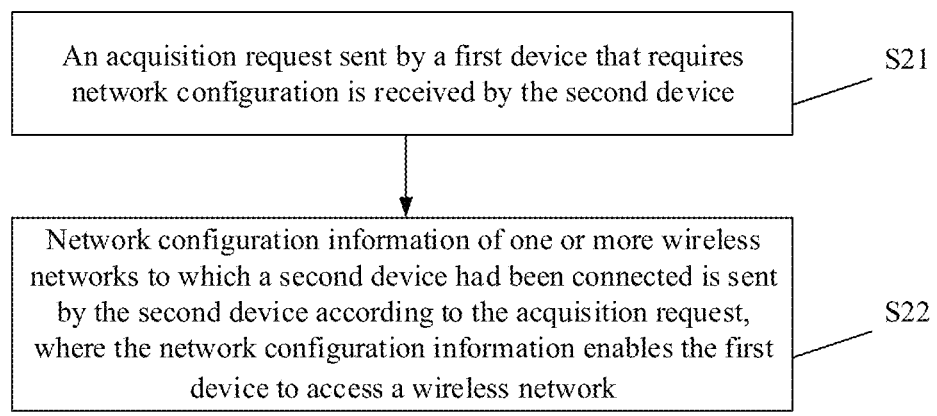
FIG. 2 is a second flowchart showing a network configuration method according to an example of the disclosure.

FIG. 2 is a second flowchart showing a network configuration method, according to an example of the disclosure. The network configuration method is applied to a second device. As shown in FIG. 2, the network configuration method includes the following operations.

In S21, an acquisition request sent by a first device that requires network configuration is received by the second device.

In S22, network configuration information of one or more wireless networks to which the second device had been connected is sent by the second device according to the acquisition request, the network configuration information being used by the first device to access a wireless network. That is, the network configuration information enables the first device to access a wireless network.

In the examples of the disclosure, the second device may be a management device that manages the first device. For example, the second device is a laptop for managing a smart speaker, or the second device is a smart watch. The second device may also be an IOT device different from the first device. For example, the first device is a smart speaker, and the second device is a smart TV.

Figure 3:
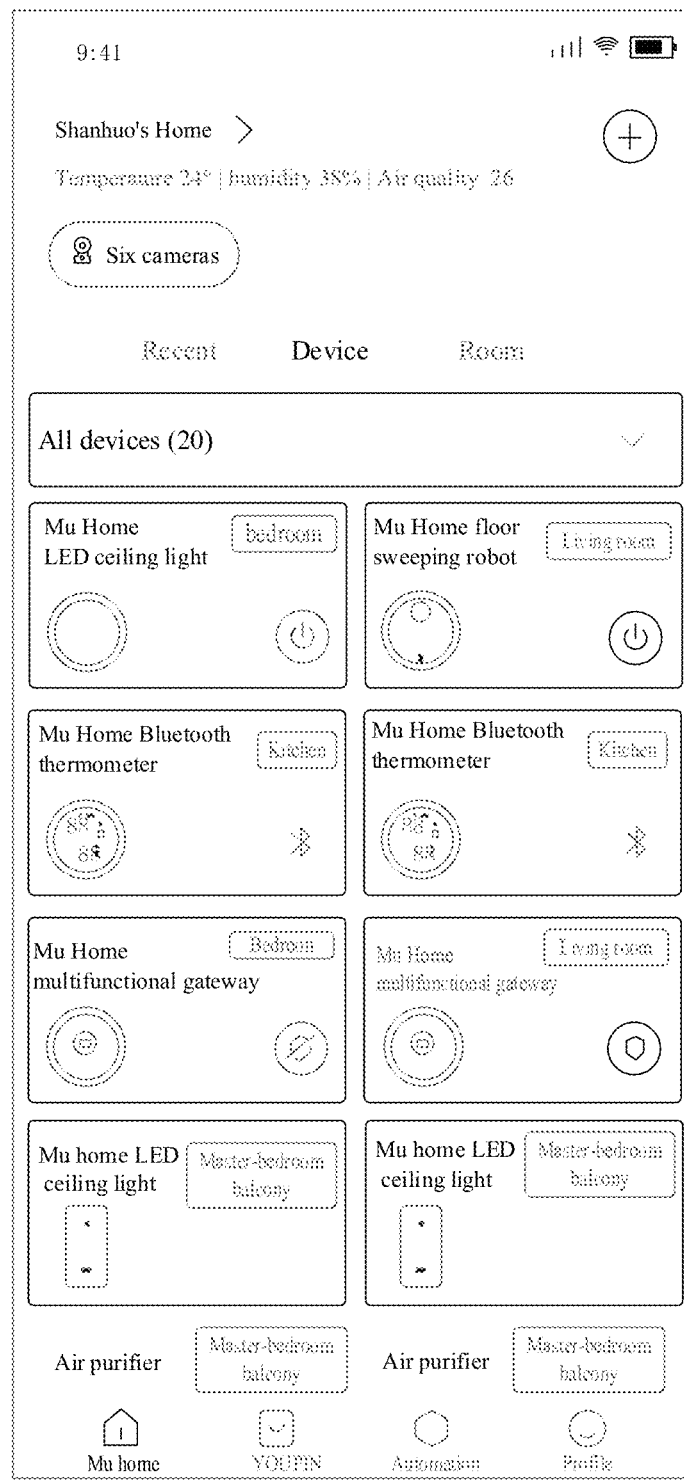
FIG. 3 is an interface diagram of smart devices managed in a mobile phone application according to an example of the disclosure.

It is to be noted that when the second device is a mobile phone for managing smart devices, all the managed smart devices are displayed in a mobile phone APP of the mobile phone. FIG. 3 is an interface diagram of smart devices managed in a mobile phone application according to an example of the disclosure. As shown in FIG. 3, the mobile phone manages smart devices such as ceiling lights, floor sweeping robots, thermometers, gateways, and water purifiers. Any of the devices shown in FIG. 3 may be a first device.

In the examples of the disclosure, the second device stores network configuration information of one or more wireless networks to which it had been connected. When the second device stores the network configuration information of the wireless networks to which it had been connected, the network configuration information may be stored after confirmation by a user.

Figure 4:
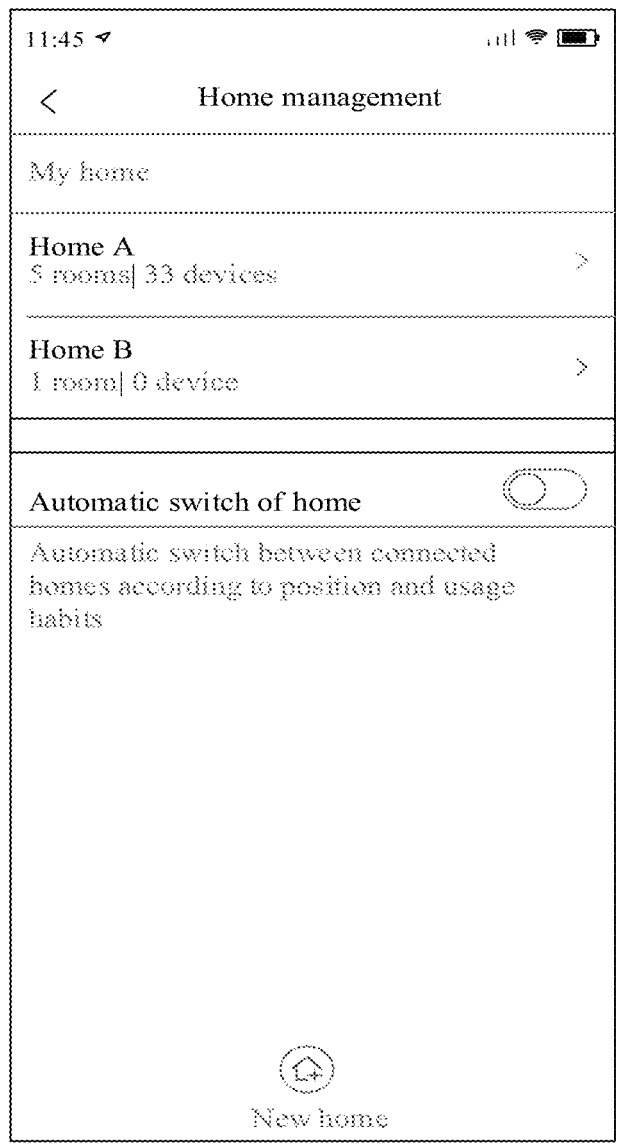
FIG. 4 is a first interface diagram of network configuration information stored in a mobile phone application according to an example of the disclosure.
Figure 5:
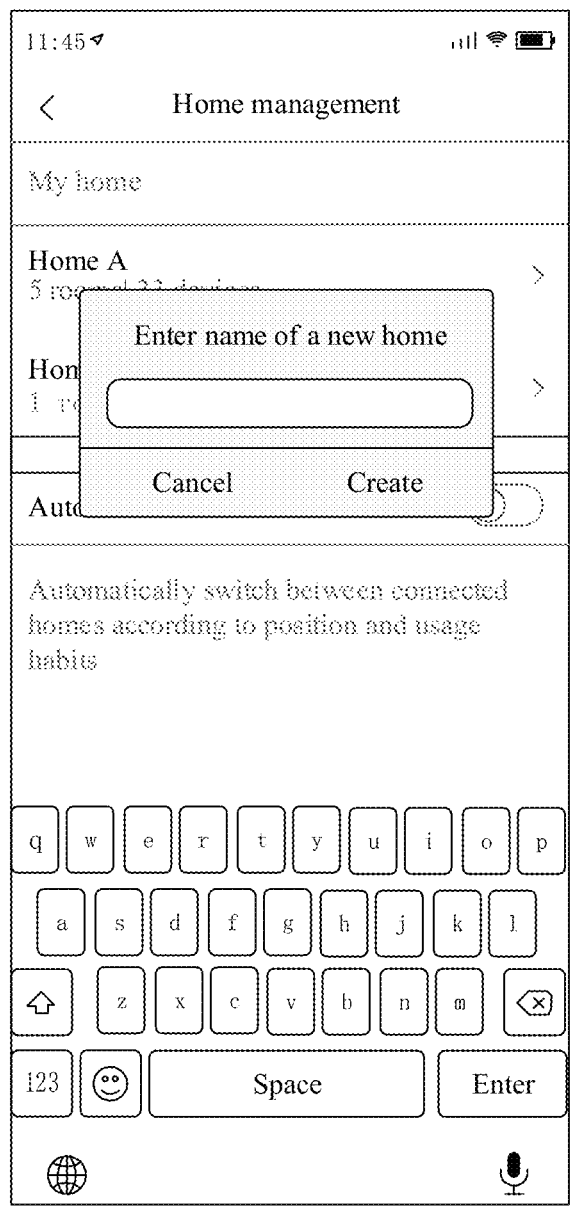
FIG. 5 is a second interface diagram of network configuration information stored in a mobile phone application according to an example of the disclosure.

FIG. 4 is a first interface diagram of network configuration information stored in a mobile phone application according to an example of the disclosure. FIG. 5 is a second interface diagram of network configuration information stored in a mobile phone application according to an example of the disclosure. As shown in FIG. 4, home management includes two pieces of network configuration information namely "Home A" and "Home B". "Home A" corresponds to a Wi-Fi account and password of user's home. "Home B" corresponds to a Wi-Fi account and password of user's company. When a new wireless network is joined by the mobile phone, as shown in FIG. 5, the mobile phone app displays a prompt message to remind a user whether to create a new home name. If the user selects "Cancel" in an interface of FIG. 5, the mobile phone app will not store the newly joined wireless network. If the user inputs "Home C" in an input box and the user clicks "Create", the mobile phone app will establish and store a corresponding relationship between the network configuration information of the currently joined wireless network and "Home C".

It is to be noted that in the examples of the disclosure, the second device may also switch between wireless networks based on the stored network configuration information of the connected wireless network. As shown in FIG. 4, when the second device determines that an "Automatic Switch of Home" function is enabled, if the second device moves from the wireless network coverage range of home A to the wireless network coverage range of home B, the second device will automatically switch to access a wireless network corresponding to "Home B". When the second device determines that the "Automatic Switch of Home" function is not enabled, the second device cannot automatically switch between the wireless networks.

In S21, for example, when the first device needs configuration of a Wi-Fi network, the second device may receive an acquisition request from the first device based on a Bluetooth communication with the first device.

In the examples of the disclosure, if the second device is a mobile phone for managing the first device, the second device may also confirm whether the first device belongs to smart devices managed by the second device after receiving an acquisition request of the first device. The second device sends, responsive to the first device belonging to the smart devices managed by the second device, the network configuration information of wireless networks to which it had been connected, so as to improve the security of sending the network configuration information.

In one example, S22 includes:

when the acquisition request carries a wireless network identifier of a wireless network searched by the first device, network configuration information that matches the wireless network identifier among the network configuration information of the wireless networks to which the second device had been connected is sent to the first device; and/or when the acquisition request does not carry the wireless network identifier, network configuration information of at least one of the wireless networks to which the second device had been connected is sent to the first device.

In this example, the second device sends network configuration information that matches the wireless network identifier carried in the acquisition request or sends a plurality of pieces of network configuration information at a time, which facilitates a quick network configuration for the first device.

In one example, the operation S22 includes:

a query message for querying whether to synchronize the network configuration information is displayed according to the acquisition request;

a confirmation message for the query message is received; and the network configuration information of the one or more wireless networks to which the second device had been connected is sent according to the confirmation message.

In this example, the second device does not directly send the network configuration information after receiving the acquisition request, but displays a query message for querying whether to synchronize the network configuration information, so as to allow the user to confirm whether to send the network configuration information to the first device. After receiving the confirmation message input by the user, the second device sends the network configuration information of the wireless network to which the second device had been connected, so that the network configuration information is sent to the first device confirmed by the user, thereby improving the synchronization security of the network configuration information.

It can be understood that in the examples of the disclosure, after receiving the acquisition request sent by the first device when network configuration is required, the second device sends the network configuration information of the wireless networks to which the second device had been connected to the first device, which facilitates for the first device to access the wireless network. In this process, based on the storage of the network configuration information of the wireless networks connected by the second device, the first device may automatically obtain the network configuration information and implement network configuration based on the acquisition request without manually inputting the network configuration information by the user, thereby improving the intelligence of network configuration.

Figure 6:
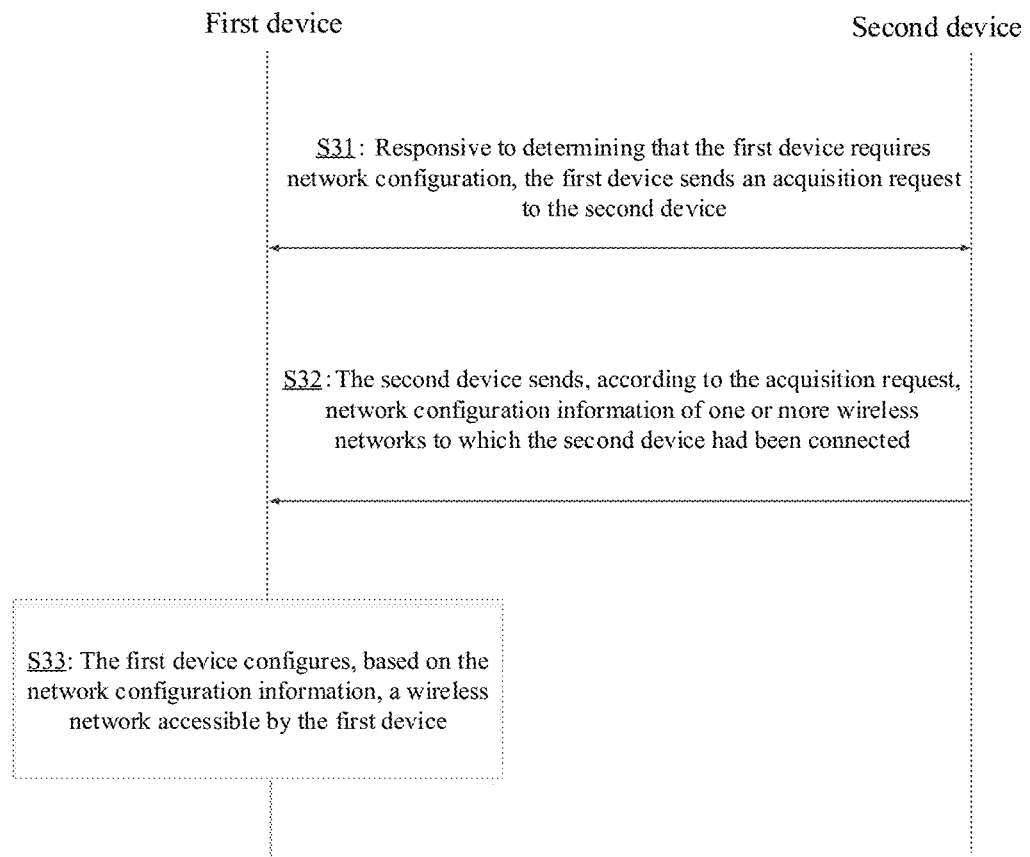
FIG. 6 is an interactive flow diagram of a network configuration method according to an example of the disclosure.

FIG. 6 is an interactive flow diagram of a network configuration method, according to an example of the disclosure. As shown in FIG. 6, the network configuration method is applied to a first device and a second device and includes the following operations.

In S31, responsive to determining that the first device requires network configuration, the first device sends an acquisition request to the second device.

In S32, the second device sends, according to the acquisition request, network configuration information of one or more wireless networks to which the second device had been connected.

In S33, the first device configures, based on the network configuration information, an accessible wireless network for the first device, i.e., a wireless network accessible by the first device.

It can be understood that in the examples of the disclosure, upon determining that network configuration is required, a first device sends an acquisition request to a second device to obtain network configuration information that is stored in the second device and belongs to a wireless network to which the second device had been connected. After obtaining the network configuration information, the first device may configure an accessible wireless network based on network configuration information and access the accessible wireless network. In this process, after an active request for network configuration information from the first device, the network configuration information of the wireless network to which the second device had been connected may be automatically obtained and network configuration may be implemented by the first device, without manually inputting the network configuration information by the user, thereby improving the intelligence of network configuration.

Figure 7:
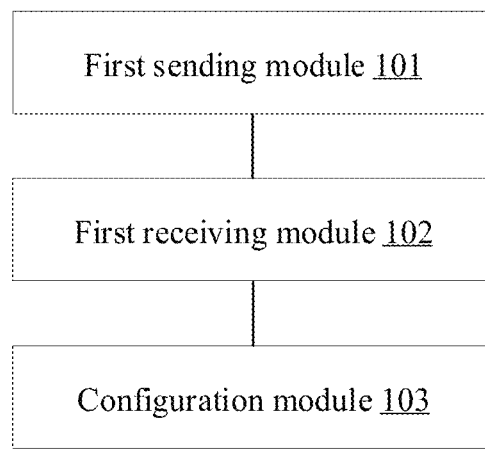
FIG. 7 is a first diagram illustrating an apparatus for network configuration according to an example.

FIG. 7 is a first diagram of an apparatus for network configuration according to an example. The network configuration apparatus is applied to a first device. As shown in FIG. 7, the n apparatus for network configuration includes:

a first sending module 101, configured to send, responsive to determining that the first device requires network configuration, an acquisition request to a second device;

a first receiving module 102, configured to receive network configuration information sent by the second device according to the acquisition request, the network configuration information being network configuration information of one or more wireless networks to which the second device had been connected; and a configuration module 103, configured to configure, based on the network configuration information, an accessible wireless network for the first device.

In some examples, the first receiving module 102 is specifically configured to receive, when the acquisition request carries a wireless network identifier of a wireless network found by the first device, network configuration information that matches the wireless network identifier, sent by the second device based on the acquisition request; and receive, when the acquisition request does not carry the wireless network identifier, network configuration information of at least one of the one or more wireless networks, sent by the second device based on the acquisition request and stored by the second device.

In some examples, the device further includes:

a first determination module 104, configured to determine that the first device requires network configuration when searching for a wireless network corresponding to the network configuration information stored by the first device fails; and determine that the first device requires network configuration when accessing of the wireless network based on the network configuration information stored by the first device fails.

In some examples, the device further includes:

a second determination module 105, configured to determine that the first device requires network configuration if a position variation of the first device is greater than a predetermined threshold.

Figure 8:
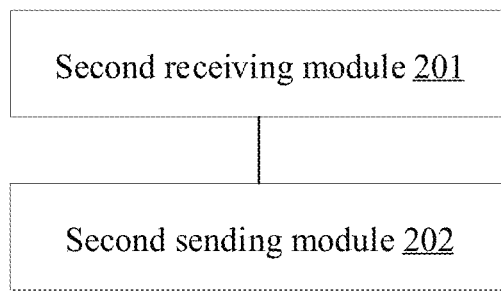
FIG. 8 is a second diagram illustrating an apparatus for network configuration according to an example.

FIG. 8 is a second diagram of an apparatus for network configuration according to an example. The apparatus for network configuration is applied to a second device. As shown in FIG. 8, the apparatus for network configuration includes:

a second receiving module 201, configured to receive an acquisition request sent by a first device when network configuration is required for the first device; and a second sending module 202, configured to send, according to the acquisition request, network configuration information of one or more wireless networks to which the second device was connected, the network configuration information being used by the first device to access a wireless network.

In some examples, the second sending module 202 is specifically configured to send, to the first device, network configuration information that matches the wireless network identifier among the network configuration information of the wireless networks to which the second device had been connected when the acquisition request carries a wireless network identifier of a wireless network searched by the first device, and send, to the first device, network configuration information of one or more wireless networks to which the second device had been connected when the acquisition request does not carry the wireless network identifier.

In some examples, the second sending module 202 is specifically configured to display, according to the acquisition request, a query message for querying whether to synchronize the network configuration information, receive a confirmation message for the query message, and send, according to the confirmation message, the network configuration information of the wireless network to which the second device was connected.

Regarding the device in the above example, the specific manner in which each module performs operations has been described in detail in the example about the method, and detailed descriptions are omitted herein.

Figure 9:
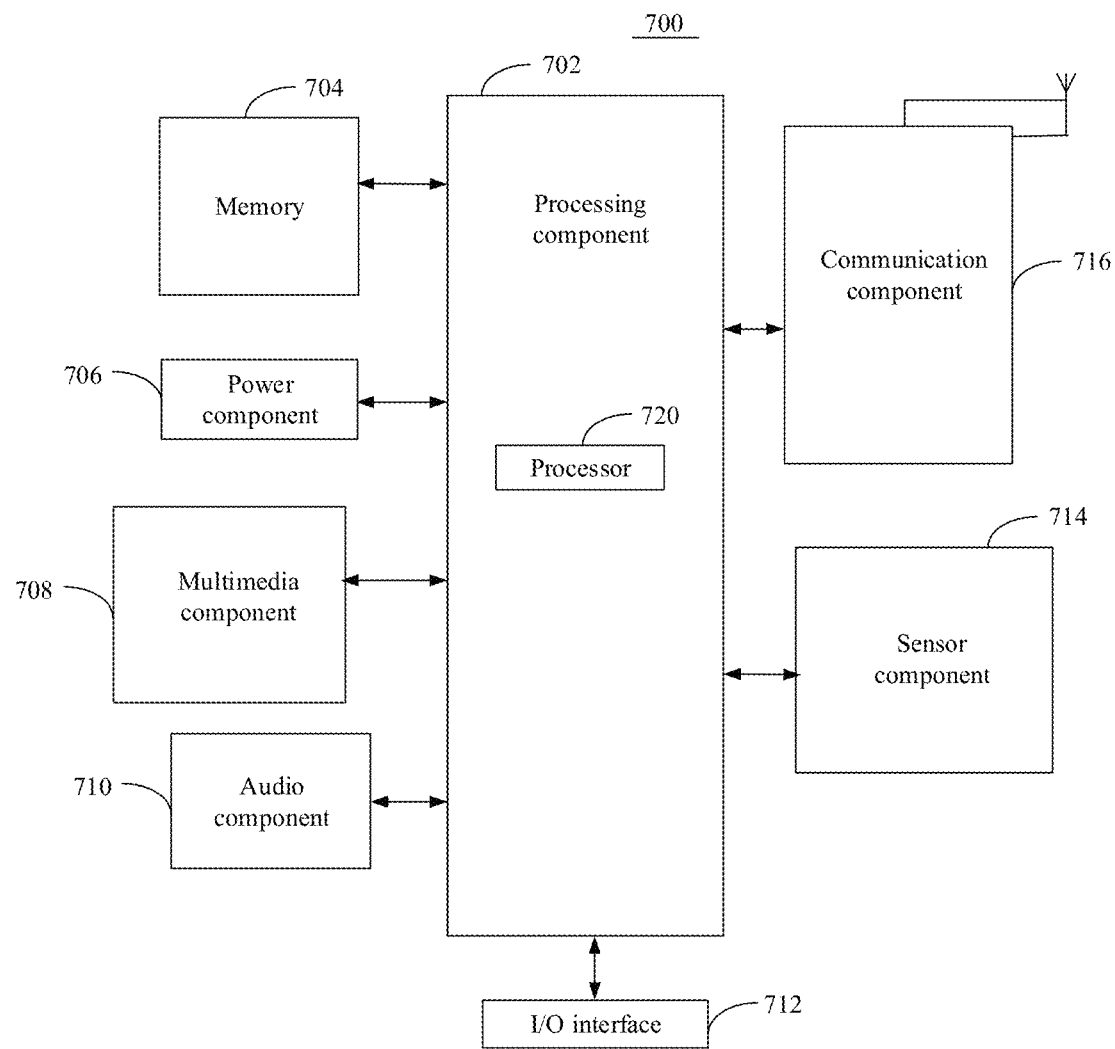
FIG. 9 is a block diagram illustrating a first device according to an example.

FIG. 9 is a block diagram of a first device according to an example. For example, the first device 700 may be a smart speaker or the like.

Referring to FIG. 9, the first device 700 may include one or more of the following components: a processing component 702, a memory 704, a power component 706, a multimedia component 708, an audio component 710, an Input/

Output (I/O) interface 712, a sensor component 714, or a communication component 716.

The processing component 702 typically controls overall operations of the device 700, such as operations associated with display, telephone calls, data communications, camera operations, and recording operations. The processing component 702 may include one or more processors 720 to execute instructions to perform all or part of the operations in the above described methods. Moreover, the processing component 702 may include one or more modules which facilitate the interaction between the processing component 702 and other components. For example, the processing component 702 may include a multimedia module to facilitate the interaction between the multimedia component 708 and the processing component 702.

The memory 704 is configured to store various types of data to support the operations of the device 700. Examples of such data include instructions for any applications or methods operated on the device 700, contact data, phonebook data, messages, pictures, video, etc. The memory 704 may be implemented using any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

The power component 706 provides power to various components of the device 700. The power component 706 may include a power management system, one or more power sources, and any other components associated with the generation, management and distribution of power in the device 700.

The multimedia component 708 includes a screen providing an output interface between the device 700 and the user. In some examples, the screen may include a Liquid Crystal Display (LCD) and a Touch Panel (TP). If the screen includes the TP, the screen may be implemented as a touch screen to receive input signals from the user. The TP includes one or more touch sensors to sense touches, swipes and gestures on the TP. The touch sensors may not only sense a boundary of a touch or swipe action, but also sense a period of time and a pressure associated with the touch or swipe action. In some examples, the multimedia component 708 includes a front camera and/or a rear camera. The front camera and/or the rear camera may receive an external multimedia datum while the device 700 is in an operation mode, such as a photographing mode or a video mode. Each of the front camera and the rear camera may be a fixed optical lens system or have focus and optical zoom capability.

The audio component 710 is configured to output and/or input audio signals. For example, the audio component 710 includes a Microphone (MIC) configured to receive an external audio signal when the device 700 is in an operation mode, such as a call mode, a recording mode, and a voice recognition mode. The received audio signal may be further stored in the memory 804 or transmitted via the communication component 716. In some examples, the audio component 710 further includes a speaker to output audio signals.

The I/O interface 712 provides an interface between the processing component 702 and peripheral interface modules, such as a keyboard, a click wheel, or buttons. The buttons may include, but are not limited to, a home button, a volume button, a starting button, and a locking button.

The sensor component 714 includes one or more sensors to provide status assessments of various aspects of the device 700. For example, the sensor component 714 may detect an open/closed status of the device 700, and relative positioning of components. For example, the component is the display and the keypad of the device 700. The sensor component 714 may also detect a change in position of the device 700 or a component of the device 700, a presence or absence of user contact with the device 700, an orientation or an acceleration/deceleration of the device 700, and a change in temperature of the device 700. The sensor component 714 may include a proximity sensor configured to detect the presence of nearby objects without any physical contact. The sensor component 714 may also include a light sensor, such as a Complementary Metal Oxide Semiconductor (CMOS) or Charge Coupled Device (CCD) image sensor, for use in imaging applications. In some examples, the sensor component 714 may also include an acceleration sensor, a gyroscope sensor, a magnetic sensor, a pressure sensor, or a temperature sensor.

The communication component 716 is configured to facilitate communication, wired or wirelessly, between the device 700 and other devices. The device 700 may access a wireless network based on a communication standard, such as Wi-Fi, 2G or 3G, or a combination thereof. In one example, the communication component 716 receives a broadcast signal or broadcast associated information from an external broadcast management system via a broadcast channel. In one example, the communication component 716 further includes a Near Field Communication (NFC) module to facilitate short-range communications. For example, the NFC module may be implemented based on a Radio Frequency Identification (RFID) technology, an Infrared Data Association (IrDA) technology, an Ultra-Wideband (UWB) technology, a Bluetooth (BT) technology, and other technologies.

In some examples, the device 700 may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors, or other electronic elements, for performing the above described methods.

In some examples, there is also provided a non-transitory computer-readable storage medium including instructions, such as included in the memory 704, executable by the processor 720 of the device 700 to complete the above described methods. For example, the non-transitory computer-readable storage medium may be a ROM, a Random Access Memory (RAM), a Compact Disc Read-Only Memory (CD-ROM), a magnetic tape, a floppy disc, an optical data storage device and the like.

An apparatus of network configuration, applied to a first device, is provided. The apparatus includes: one or more processors; and a memory configured to storing instructions executable by the one or more processors. The one or more processors, upon execution of the instructions, are configured to:

send, responsive to determining that the first device requires network configuration, an acquisition request to a second device;

receive network configuration information sent by the second device according to the acquisition request, the network configuration information including network configuration information of one or more wireless networks to which the second device had been connected; and configure, based on the network configuration information, a wireless network accessible by the first device.

A non-transitory computer-readable storage medium having instructions stored therein is provided. The instructions, when being executed by a processor of a first device, causes the first device to perform a control method. The method includes:

responsive to determining that the first device requires network configuration, an acquisition request is sent to a second device by the first device;

network configuration information sent by the second device according to the acquisition request is received by the first device, the network configuration information being network configuration information of one or more wireless networks to which the second device had been connected; and a wireless network accessible by the first device is configured by the first device based on the network configuration information.

Figure 10:
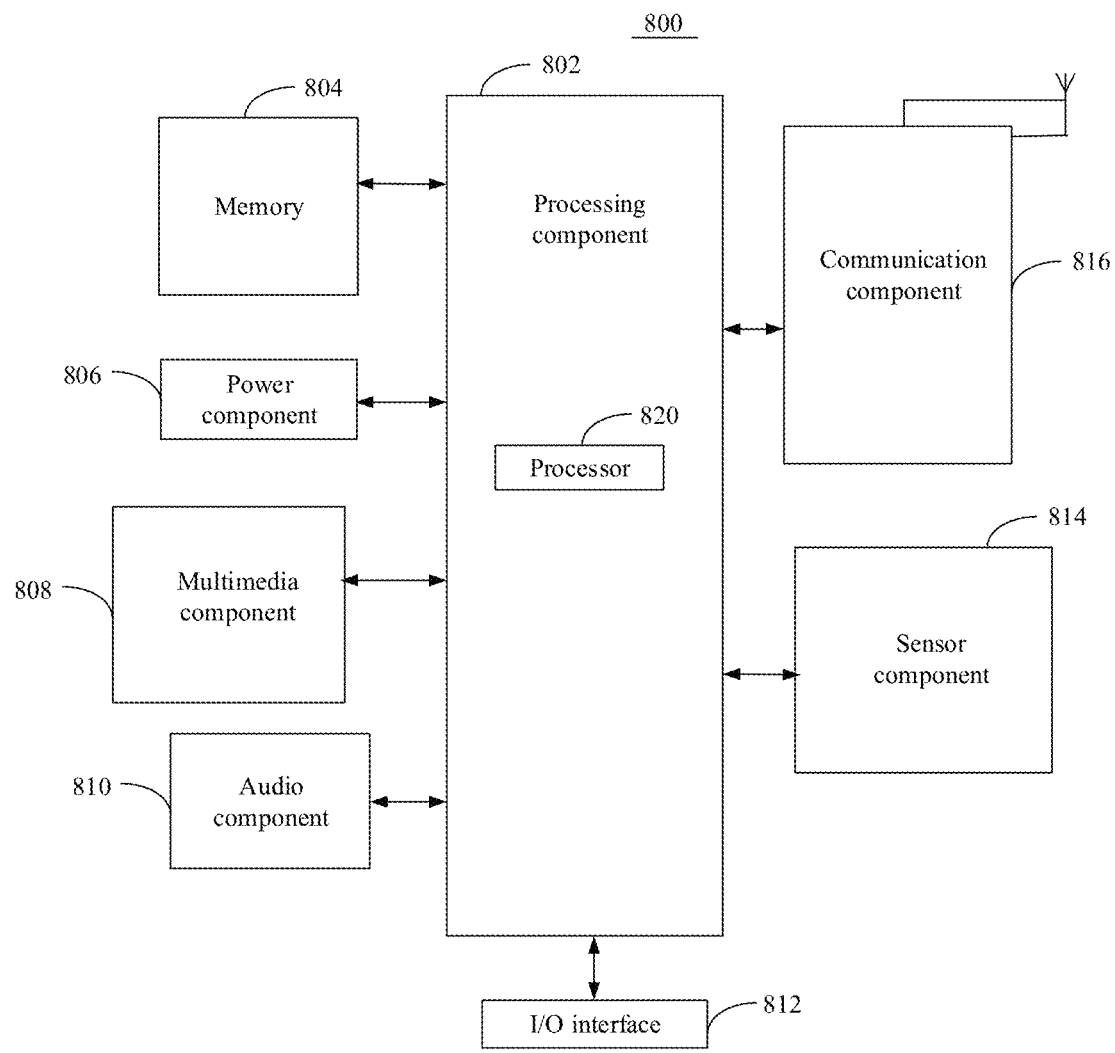
FIG. 10 is a block diagram illustrating a second device according to an example.

FIG. 10 is a block diagram of a second device according to an example. For example, the second device 800 may be a mobile phone or the like.

Referring to FIG. 10, the second device 800 may include one or more of the following components: a processing component 802, a memory 804, a power component 806, a multimedia component 808, an audio component 810, an I/O interface 812, a sensor component 814, or a communication component 816.

The processing component 802 typically controls overall operations of the device 800, such as operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For example, the processing component 802 may include a multimedia module to facilitate the interaction between the multimedia component 808 and the processing component 802.

The memory 804 is configured to store various types of data to support the operations of the device 800. Examples of such data include instructions for any applications or methods operated on the device 800, contact data, phonebook data, messages, pictures, video, etc. The memory 804 may be implemented using any type of volatile or non-volatile memory devices, or a combination thereof, such as a SRAM, an EEPROM, an EPROM, a PROM, a ROM, a magnetic memory, a flash memory, a magnetic or optical disk.

The power component 806 provides power to various components of the device 800. The power component 806 may include a power management system, one or more power sources, and any other components associated with the generation, management and distribution of power in the device 800.

The multimedia component 808 includes a screen providing an output interface between the device 800 and the user. In some examples, the screen may include a LCD and a TP. If the screen includes the TP, the screen may be implemented as a touch screen to receive input signals from the user. The TP includes one or more touch sensors to sense touches, swipes and gestures on the TP. The touch sensors may not only sense a boundary of a touch or swipe action, but also sense a period of time and a pressure associated with the touch or swipe action. In some examples, the multimedia component 808 includes a front camera and/or a rear camera. The front camera and/or the rear camera may receive an external multimedia datum while the device 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a MIC configured to receive an external audio signal when the device 800 is in an operation mode, such as a call mode, a recording mode, and a voice recognition mode. The received audio signal may be further stored in the memory 804 or transmitted via the communication component 816. In some examples, the audio component 810 further includes a speaker to output audio signals.

The I/O interface 812 provides an interface between the processing component 802 and peripheral interface modules, such as a keyboard, a click wheel, or buttons. The buttons may include, but are not limited to, a home button, a volume button, a starting button, and a locking button.

The sensor component 814 includes one or more sensors to provide status assessments of various aspects of the device 800. For example, the sensor component 814 may detect an open/closed status of the device 800, and relative positioning of components. For example, the component is the display and the keypad of the device 800. The sensor component 814 may also detect a change in position of the device 800 or a component of the device 800, a presence or absence of user contact with the device 800, an orientation or an acceleration/deceleration of the device 800, and a change in temperature of the device 800. The sensor component 814 may include a proximity sensor configured to detect the presence of nearby objects without any physical contact. The sensor component 814 may also include a light sensor, such as a CMOS or CCD image sensor, for use in imaging applications. In some examples, the sensor component 814 may also include an acceleration sensor, a gyroscope sensor, a magnetic sensor, a pressure sensor, or a temperature sensor.

The communication component 816 is configured to facilitate communication, wired or wirelessly, between the device 800 and other devices. The device 800 may access a wireless network based on a communication standard, such as Wi-Fi, 2G or 3G, or a combination thereof. In one example, the communication component 816 receives a broadcast signal or broadcast associated information from an external broadcast management system via a broadcast channel. In one example, the communication component 816 further includes an NFC module to facilitate short-range communications. For example, the NFC module may be implemented based on an RFID technology, an IrDA technology, an UWB technology, a BT technology, and other technologies.

In some examples, the device 800 may be implemented with one or more ASICs, DSPs, DSPDs, PLDs, FPGAs, controllers, micro-controllers, microprocessors, or other electronic elements, for performing the above described methods.

In some examples, there is also provided a non-transitory computer-readable storage medium including instructions, such as included in the memory 804, executable by the processor 820 of the device 800 to complete the above described methods. For example, the non-transitory computer-readable storage medium may be a ROM, a RAM, a CD-ROM, a magnetic tape, a floppy disc, an optical data storage device and the like.

An apparatus of network configuration for enabling wireless network access of a first device, applied to a second device, is provided. The apparatus includes: one or more processors; and a memory configured to storing instructions executable by the one or more processors. The one or more processors, upon execution of the instructions, are configured to:

receive an acquisition request sent by the first device that requires network configuration; and send, according to the acquisition request, network configuration information of one or more wireless networks to which the second device had been connected, where the network configuration information enables the first device to access a wireless network.

A non-transitory computer-readable storage medium having instructions stored therein is provided. The instructions, when being executed by a processor of a second device, causes the second device to perform a control method. The method includes:

an acquisition request sent by a first device that requires network configuration is received; and network configuration information of one or more wireless networks to which the second device had been connected is sent according to the acquisition request, the network configuration information enables the first device to access a wireless network.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

Other examples of the disclosure will be apparent to those skilled in the art from consideration of the specification and practice of the disclosure disclosed here. The disclosure is intended to cover any variations, uses, or adaptations of the disclosure following the general principles thereof and including such departures from the disclosure as come within known or customary practice in the art. It is intended that the specification and examples be considered as exemplary only.

It will be appreciated that the disclosure is not limited to the exact construction that has been described above and illustrated in the accompanying drawings, and that various modifications and changes can be made without departing from the scope thereof

What is claimed is:

1. A method of network configuration, applied to a first device, the method comprising:

sending an acquisition request to a second device in response to determining that the first device requires network configuration;

receiving network configuration information sent by the second device according to the acquisition request, the network configuration information comprising network configuration information of one or more wireless networks to which the second device had been connected; and configuring, based on the network configuration information, a wireless network accessible by the first device, wherein receiving the network configuration information sent by the second device according to the acquisition request comprises:

upon determining that the acquisition request does not carry a wireless network identifier of a wireless network found by the first device, receiving the network configuration information of the one or more wireless networks, that is stored by the second device, sent by the second device based on the acquisition request.

2. The method of claim 1, wherein receiving the network configuration information sent by the second device according to the acquisition request further comprises:

upon determining that the acquisition request carries the wireless network identifier, receiving network configuration information, that matches the wireless network identifier, sent by the second device based on the acquisition request.

3. The method of claim 1, further comprising:

determining that the first device requires network configuration, in response to failure of finding a wireless network corresponding to network configuration information stored by the first device; and/or determining that the first device requires network configuration, in response to failure of accessing the wireless network based on the network configuration information stored by the first device.

4. The method of claim 1, further comprising:

determining that the first device requires network configuration in response to determining that a position variation of the first device is greater than a predetermined threshold.

5. The method of claim 1, wherein the network configuration information comprises at least one of following items: a wireless network identifier and a password corresponding to the wireless network identifier.

6. A method for enabling wireless network access of a first device, applied to a second device, the method comprising:

receiving an acquisition request sent by the first device that requires network configuration; and sending, according to the acquisition request, network configuration information of one or more wireless networks to which the second device had been connected, wherein the network configuration information enables the first device to access a wireless network, wherein sending, according to the acquisition request, the network configuration information of the one or more wireless network to which the second device had been connected comprises:

upon determining that the acquisition request does not carry a wireless network identifier of a wireless network found by the first device, sending, to the first device, the network configuration information of the one or more wireless networks to which the second device had been connected.

7. The method of claim 6, wherein sending, according to the acquisition request, the network configuration information of the one or more wireless network to which the second device had been connected further comprises:
upon determining that the acquisition request carries the wireless network identifier, sending, to the first device, network configuration information that matches the wireless network identifier among the network configuration information of the one or more wireless networks to which the second device had been connected.

8. The method of claim 6, wherein sending, according to the acquisition request, the network configuration information of the one or more wireless network to which the second device had been connected comprises:
displaying, according to the acquisition request, a query message for querying whether to synchronize the network configuration information;
receiving a confirmation message for the query message; and
sending, according to the confirmation message, the network configuration information of the one or more wireless networks to which the second device had been connected.

9. An apparatus of network configuration, applied to a first device and comprising:
one or more processors; and
a memory configured to store instructions executable by the one or more processors, wherein the one or more processors, upon execution of the instructions, are configured to:
send an acquisition request to a second device, in response to determining that the first device requires network configuration;
receive network configuration information sent by the second device according to the acquisition request, the network configuration information comprising network configuration information of one or more wireless networks to which the second device had been connected; and
configure, based on the network configuration information, a wireless network accessible by the first device,
wherein the one or more processors are further configured to:
receive, upon determining that the acquisition request does not carry a wireless network identifier of a wireless network found by the first device, the network configuration information of the one or more wireless networks, that is stored by the second device, sent by the second device based on the acquisition request.

10. The apparatus of claim 9, wherein the one or more processors are further configured to:
receive, upon determining that the acquisition request carries the wireless network identifier, network configuration information, that matches the wireless network identifier, sent by the second device based on the acquisition request.

11. The apparatus of claim 9, wherein the one or more processors are further configured to:

determine that the first device requires network configuration, in response to failure of finding a wireless network corresponding to the network configuration information stored by the first device; and/or
determine that the first device requires network configuration, in response to failure of accessing the wireless network based on the network configuration information stored by the first device.

12. The apparatus of claim 9, wherein the one or more processors are further configured to:
determine that the first device requires network configuration in response to a position variation of the first device that is greater than a predetermined threshold.

13. The apparatus of claim 9, wherein the network configuration information comprises at least one of: a wireless network identifier and a password corresponding to the wireless network identifier.

14. An apparatus for enabling wireless network access of a first device, applied to a second device and comprising:
one or more processors; and
a memory configured to store instructions executable by the one or more processors,
wherein the one or more processors, upon execution of the instructions, are configured to:
receive an acquisition request sent by the first device that requires network configuration; and
send, according to the acquisition request, network configuration information of one or more wireless networks to which the second device had been connected, wherein the network configuration information enables the first device to access a wireless network,
wherein the one or more processors are further configured to:
upon determining that the acquisition request does not carry a wireless network identifier of a wireless network found by the first device, send, to the first device, the network configuration information of the one or more wireless networks to which the second device had been connected.

15. The apparatus of claim 14, wherein the one or more processors are further configured to:
upon determining that the acquisition request carries the wireless network identifier, send, to the first device, network configuration information that matches the wireless network identifier among the network configuration information of the one or more wireless networks to which the second device had been connected.

16. The apparatus of claim 14, wherein the one or more processors are further configured to:
display, according to the acquisition request, a query message for querying whether to synchronize the network configuration information, receive a confirmation message for the query message, and send, according to the confirmation message, the network configuration information of the one or more wireless networks to which the second device had been connected.

* * * * *